United States Patent
Yi et al.

(10) Patent No.: US 12,513,683 B2
(45) Date of Patent: Dec. 30, 2025

(54) RESOURCE ALLOCATION METHOD AND APPARATUS AND SYSTEM

(71) Applicant: 1FINITY Inc., Kawasaki (JP)

(72) Inventors: Su Yi, Beijing (CN); Guorong Li, Beijing (CN); Yang Lu, Beijing (CN); Meiyi Jia, Beijing (CN); Lei Zhang, Beijing (CN); Xin Wang, Beijing (CN)

(73) Assignee: 1FINITY Inc., Kawasaki (JP)

( * ) Notice: Subject to any disclaimer, the term of this patent is extended or adjusted under 35 U.S.C. 154(b) by 283 days.

(21) Appl. No.: 18/120,565

(22) Filed: Mar. 13, 2023

(65) Prior Publication Data
US 2023/0217426 A1 Jul. 6, 2023

Related U.S. Application Data

(63) Continuation of application No. PCT/CN2020/117878, filed on Sep. 25, 2020.

(51) Int. Cl.
*H04W 72/12* (2023.01)

(52) U.S. Cl.
CPC .................... *H04W 72/12* (2013.01)

(58) Field of Classification Search
CPC ..... H04W 72/04; H04W 72/12; H04W 72/56; H04W 40/22; H04W 28/0252; H04W 72/6215; H04W 72/52; H04L 47/215; H04L 47/24
See application file for complete search history.

(56) References Cited

U.S. PATENT DOCUMENTS

| | | | |
|---|---|---|---|
| 2008/0062934 A1* | 3/2008 | Zhao | H04W 76/10 370/332 |
| 2009/0225711 A1 | 9/2009 | Sammour et al. | |
| 2013/0051334 A1* | 2/2013 | Sammour | H04W 72/569 370/329 |
| 2020/0045766 A1* | 2/2020 | Kim | H04W 36/0005 |
| 2020/0145967 A1 | 5/2020 | Park et al. | |
| 2021/0058328 A1 | 2/2021 | Xu et al. | |
| 2021/0127293 A1* | 4/2021 | Hong | H04W 28/0278 |
| 2021/0219183 A1 | 7/2021 | Huang et al. | |

FOREIGN PATENT DOCUMENTS

| | | |
|---|---|---|
| CN | 103607775 A | 2/2014 |
| CN | 110474849 A | 11/2019 |
| CN | 110636555 A | 12/2019 |

(Continued)

OTHER PUBLICATIONS

International Search Report and Written Opinion of the International Searching Authority issued by the China National Intellectual Property Administration for corresponding International Patent Application No. PCT/CN2020/117878, mailed on Jun. 23, 2021, with an English translation.

(Continued)

*Primary Examiner* — Mohamed A Kamara
(74) *Attorney, Agent, or Firm* — Myers Wolin, LLC

(57) ABSTRACT

A resource allocation apparatus includes processor circuitry configured to acquire UE bearer information, and processor circuitry configured to allocate a resource for an MAC SDU of a UE bearer k in a logical channel j, allocation of the resource being related to the number of tokens of UE bearer in the logical channel j.

16 Claims, 8 Drawing Sheets

---

401

UE bearer information is acquired

402 a resource is allocated for an MAC SDU of a UE bearer k in a logical channel j, allocation of the resource being related to the number of tokens of UE bearer in the logical channel j

(56) References Cited

FOREIGN PATENT DOCUMENTS

| CN | 110636628 A | 12/2019 | | |
|---|---|---|---|---|
| IN | 103945540 A | 7/2014 | | |
| WO | 2020/063722 A1 | 4/2020 | | |
| WO | 2020/086316 A1 | 4/2020 | | |
| WO | WO-2020088255 A1 * | 5/2020 | ......... | H04B 7/15528 |
| WO | 2020/164176 A1 | 8/2020 | | |

OTHER PUBLICATIONS

Huawei et al., "Discussion on the Impact of packet duplication on Bj", Agenda Item: 9.15.2, 3GPP TSG-RAN WG2 Meeting #103, R2-1812074, resubmission of R2-1808352, Gothenburg, Sweden, Aug. 20-24, 2018.

3gpp TS 36.321 V16.1.0, "3rd Generation Partnership Project, Technical Specification Group Radio Access Network; Evolved Universal Terrestrial Radio Access (E-UTRA); Medium Access Control (MAC) protocol specification (Release 16)", Jul. 2020.

Draft 3GPP TS 23.401 V16.6.0+, "3rd Generation Partnership Project; Technical Specification Group Services and System Aspects; General Packet Radio Service (GPRS) enhancements for Evolved Universal Terrestrial Radio Access Network (E-UTRAN) access (Release 16)", May 2020.

Peng et al., "Study on the technology of 5G IAB and its application in ubiquitous power internet of things", Wanfang Data, Sep. 2019, No. 9, vol. 32, with an English abstract.

Intel Corporation, "Handling of Fairness in IAB", Agenda Item: 6.1.4.3, 3GPP TSG-RAN WG2 Meeting #108, R2-1914738 (revision of R2-1912711) Reno, U.S.A., Nov. 18-22, 2019.

3GPP TR 38.874 V16.0.0, "3rd Generation Partnership Project; Technical Specification Group Radio Access Network; NR; Study on Integrated Access and Backhaul; (Release 16)", Dec. 2018.

3GPP TS 38.300 V16.1.0, "3rd Generation Partnership Project; Technical Specification Group Radio Access Network; NR; NR and NG-RAN Overall Description; Stage 2 (Release 16)", Mar. 2020.

3GPP TS 38.340 V16.0.0, "3rd Generation Partnership Project; Technical Specification Group Radio Access Network; NR; Backhaul Adaptation Protocol (BAP) specification (Release 16)", Mar. 2020.

3GPP TS 38.321 V16.1.0, "3rd Generation Partnership Project; Technical Specification Group Radio Access Network; NR; Medium Access Control (MAC) protocol specification (Release 16)", Jul. 2020.

First Notification of Office Action and Search Report issued by the China National Intellectual Property Administration for corresponding Chinese Patent Application No. 202080103705.X, mailed on Nov. 21, 2024, with an English translation.

* cited by examiner

RESOURCE ALLOCATION METHOD AND APPARATUS AND SYSTEM

CROSS-REFERENCE TO RELATED APPLICATION

This application is a continuation application of International Application PCT/CN2020/117878 filed on Sep. 25, 2020 and designated the U.S., the entire contents of which are incorporated herein by reference.

FIELD

This disclosure relates to the field of communications.

BACKGROUND

Integrated access and backhaul (IAB) realizes a wireless relay function in the next generation radio access network (NG-RAN). This relay node is referred to as an IAB node, and supports both access and backhaul (BH) via 5G new radio (NR). Each backhaul radio link control (BH RLC) channel (referred to as a BH RLC channel for short) is configured with quality of service (QoS) information or priority level, hence, selection of a BH RLC channel may promote priority processing and QoS enhancement of specific services on the backhaul link.

For an F1-U (a user plane of F1 interface) service, each GTP-U (GPRS tunneling protocol-user plane, general packet radio service tunneling protocol-user plane) pipe may be mapped to a specified BH RLC channel, or multiple GTP-U pipes may be mapped to a common BH RLC channel. That is, an IAB node needs to perform multiplexing on data radio bearers (DRBs) (referred to as UE bearers) of a terminal equipment (UE) on the BH RLC channel.

The following two bearer mapping modes may be used on the IAB node. The first mode is one-to-one mapping between UE bearers and BH RLC channels. In this mode, each UE bearer is mapped to a separate BH RLC channel, and each BH RLC channel is mapped to a separate BH RLC channel of a next hop. The number of established BH RLC channels is equal to the number of established UE bearers. The second mode is many-to-one mapping, that is, based on specific parameters, such as QoS configuration of a UE bearer, multiple UE bearers belonging to different terminal equipments are multiplexed to the same BH RLC channel.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by the inventors that when an IAB network deploys many-to-one mapping between UE bearers and BH RLC channels, or deploys one-to-one mapping and many-to-one mapping between UE bearers and BH RLC channels in a mixed manner, existing standards are unable to ensure fairness between the UE bearers.

In order to solve at least one of the above problems or other similar problems, embodiments of this disclosure provide a resource allocation method and apparatus and a system, in which topology-wide fairness with a finer granularity is provided by enhancing existing protocols, so as to approach deployment performances of a non-IAB network of a single hop.

According to an aspect of the embodiments of this disclosure, there is provided a resource allocation method, including:
  acquiring UE bearer information; and
  allocating a resource for an MAC SDU of a UE bearer k in a logical channel j, allocation of the resource being related to the number of tokens of UE bearer in the logical channel j.

According to an aspect of the embodiments of this disclosure, there is provided a resource allocation method, including:
  acquiring UE bearer information;
  dividing MAC SDUs of different UE bearers into different queues in a buffer of an MAC layer according to the UE bearer information; and
  if a logical channel j is selected for performing resource allocation, allocating resources for the MAC SDUs of the UE bearers according to the number of tokens of UE bearer ($B_k$) maintained for each UE bearer k in the logical channel j.

According to another aspect of the embodiments of this disclosure, there is provided a resource allocation method, including:
  acquiring UE bearer information;
  allocating resources for MAC SDUs of UE bearers according to the number of tokens of logical channel ($B_j$) maintained for a logical channel j, wherein the resources are allocated by round robin for the MAC SDUs of the UE bearers in the logical channel j, until either data for the logical channel j or uplink grant is exhausted.

According to another aspect of the embodiments of this disclosure, there is provided a resource allocation method, including:
  acquiring UE bearer information;
  dividing MAC SDUs of different UE bearers into different queues in a buffer of an MAC layer according to the UE bearer information; and
  if a logical channel j is selected for performing resource allocation, allocating resources for the MAC SDUs of the UE bearers according to the number of tokens of logical channel ($B_j$) maintained for the logical channel j, wherein the resources are allocated by round robin for the MAC SDUs of the UE bearers in the logical channel j, until either data for the logical channel j or uplink grant is exhausted.

According to still another aspect of the embodiments of this disclosure, there is provided a resource allocation method, including:
  acquiring the number of UE bearers on an ingress BH RLC channel; and
  allocating a resource for an MAC SDU from an ingress BH RLC channel m in a logical channel j according to a first number of tokens ($B_m$), the first number of tokens ($B_m$) being related to the number of UE bearers on each ingress BH RLC channel in the logical channel j.

According to still another aspect of the embodiments of this disclosure, there is provided a resource allocation method, including:
  acquiring the number of UE bearers on each ingress BH RLC channel;
  dividing MAC SDUs from different ingress BH RLC channels into different queues in a buffer of an MAC layer; and if a logical channel j is selected for performing resource allocation, allocating resources for the MAC SDUs from the ingress BH RLC channels according to the number of tokens ($B_m$) maintained for queues from the ingress BH RLC channels m in the logical channel j, the number of tokens ($B_m$) being related to the number of UE bearers on each ingress BH RLC channel, and the MAC SDUs from each ingress BH RLC channel referring to MAC SDUs of all UE bearers on the ingress BH RLC channel.

According to an aspect of the embodiments of this disclosure, there is provided a resource allocation apparatus, including:

an acquiring unit configured to acquire UE bearer information; and an allocating unit configured to allocate a resource for an MAC SDU of a UE bearer k in a logical channel j, allocation of the resource being related to the number of tokens of UE bearer in the logical channel j.

According to an aspect of the embodiments of this disclosure, there is provided a resource allocation apparatus, including:

an acquiring unit configured to acquire UE bearer information;

a first processing unit configured to divide MAC SDUs of different UE bearers into different queues in a buffer of an MAC layer according to the UE bearer information; and an allocating unit configured to, if a logical channel j is selected for performing resource allocation, allocate resources for the MAC SDUs of the UE bearers according to the number of tokens of UE bearer ($B_k$) maintained for each UE bearer in the logical channel j.

According to another aspect of the embodiments of this disclosure, there is provided a resource allocation apparatus, including:

an acquiring unit configured to acquire UE bearer information;

an allocating unit configured to allocate resources for MAC SDUs of UE bearers according to the number of tokens of logical channel ($B_j$) maintained for a logical channel j, wherein the resources are allocated by round robin for the MAC SDUs of the UE bearers in the logical channel j, until either data for the logical channel j or uplink grant is exhausted.

According to another aspect of the embodiments of this disclosure, there is provided a resource allocation apparatus, including:

an acquiring unit configured to acquire UE bearer information;

a processing unit configured to divide MAC SDUs of different UE bearers into different queues in a buffer of an MAC layer according to the UE bearer information; and an allocating unit configured to, if a logical channel j is selected for performing resource allocation, allocate resources for the MAC SDUs of the UE bearers according to the number of tokens of logical channel ($B_j$) maintained for the logical channel j, wherein the resources are allocated by round robin for the MAC SDUs of the UE bearers in the logical channel j, until either data for the logical channel j or uplink grant is exhausted.

According to still another aspect of the embodiments of this disclosure, there is provided a resource allocation apparatus, including:

an acquiring unit configured to acquire the number of UE bearers on an ingress BH RLC channel; and an allocating unit configured to allocate a resource for an MAC SDU from an ingress BH RLC channel m in a logical channel j according to a first number of tokens ($B_m$), the first number of tokens ($B_m$) being related to the number of UE bearers on each ingress BH RLC channel in the logical channel j.

According to still another aspect of the embodiments of this disclosure, there is provided a resource allocation apparatus, including:

an acquiring unit configured to acquire the number of UE bearers on each ingress BH RLC channel;

a first processing unit configured to divide MAC SDUs from different ingress BH RLC channels into different queues in a buffer of an MAC layer; and an allocating unit configured to, if a logical channel j is selected for performing resource allocation, allocate resources for the MAC SDUs from the ingress BH RLC channels according to the number of tokens ($B_m$) maintained for queues from the ingress BH RLC channels m in the logical channel j, the number of tokens ($B_m$) being related to the number of UE bearers on each ingress BH RLC channel, and the MAC SDUs from each ingress BH RLC channel referring to MAC SDUs of all UE bearers on the ingress BH RLC channel.

One of advantages of the embodiments of this disclosure exists in that according to the embodiments of this disclosure, fairness between users having identical QoS demands in a multi-hop IAB network may be ensured.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figure 1:
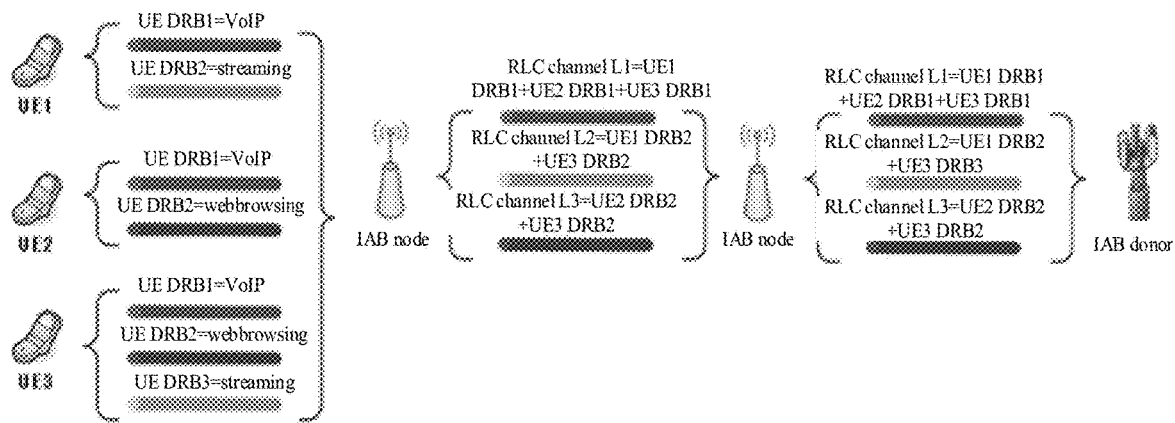
FIG. 1 is a schematic diagram of an example of many-to-one mapping between UE bearers and BH RLC channels.

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and 6G in the future, etc., and/or other communication protocols that are currently known or will be developed in the future.

In the embodiments of this disclosure, the term "network device", for example, refers to a device in a communication system that accesses a user equipment to the communication network and provides services for the user equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, depending on a context of the term.

In the embodiments of this disclosure, the term "user equipment (UE)" refers to, for example, an equipment accessing to a communication network and receiving network services via a network device, and may also be referred to as "a terminal equipment (TE)". The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal, etc.

It was found by the inventors that in the mode of many-to-one mapping between the UE bearers and BH RLC channels mentioned in the background, fairness issue may occur in the IAB network. As shown in FIG. 1, a current BAP (backhaul adaptation protocol) layer design and MAC (medium access control) layer design of IAB node will not distinguish different UE bearers within a BH RLC channel in data buffering and scheduling, resulting in the failure to satisfy the fairness between different UEs. Furthermore, it was found by the inventors that an IAB network should try to schedule wireless resources to meet a QoS requirement of each UE bearer, regardless of the number of hops a given UE is away from a donor DU (distributed unit). Although QoS differentiation may possibly still be partially realized when UE bearers are aggregated to the BH RLC channel, enforcement of fairness across UE bearers becomes less granular.

Figure 2:
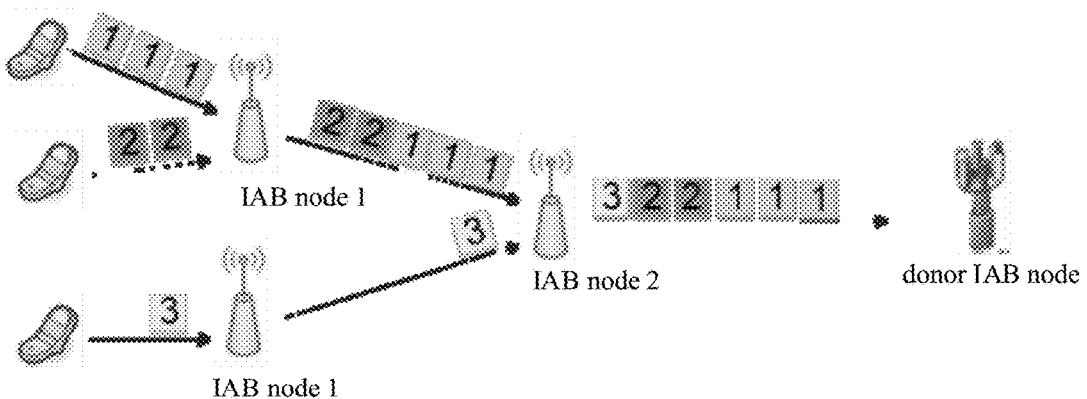
FIG. 2 is a schematic diagram of an example with no fairness enhancement.

FIG. 2 is a schematic diagram of an example with no fairness enhancement. As shown in FIG. 2, on a BH RLC channel, if data rates of multiple UE bearers are different at a certain moment, fairness between the UE bearers are unable to be ensured. In FIG. 2, it is assumed that data flows of different UE bearers have the same QoS level, and the different UE bearers are mapped to the same BH RLC channel at each IAB node. If there is no support of fairness, a packet of a UE, such as the block marked by "1" in FIG. 2, may possibly be transmitted preferentially. In this case, packets of other UE bearers may possibly be delayed, resulting in degradation of QoS performance.

This disclosure achieves topology-wide fairness by enhancing fairness at each IAB node. For the convenience of explanation, this disclosure takes a 5G multi-hop IAB network deployment scenario as an example. In this scenario, multiple UEs are connected to an IAB-donor via IAB nodes of multiple hops, and are finally connected to a 5G network. However, this disclosure is not limited thereto, and is also applicable to other scenarios where fairness enhancement is concerned. As long as the principle of this disclosure is applied, it will be deemed as falling into the protection scope of this disclosure.

Various embodiments of this disclosure shall be described below with reference to the accompanying drawings. These embodiments are illustrative only and are not intended to limit this disclosure.

Embodiment of a First Aspect

The embodiment of this disclosure provides a resource allocation method, which shall be described from a side of an IAB node in an IAB network.

In the embodiment of this disclosure, the IAB node supports a gNB-DU (distributed unit) functionality to terminate NR access interfaces to the UE and a next hop of IAB node, and terminate an F1 protocol to a gNB-CU (central unit) functionality on the IAB-donor. The gNB-DU functionality on the IAB node is also referred to as an IAB-DU. The IAB node also supports a subset of UE functionality, referred to as IAB-MT (mobile termination), which is used to connect to another IAB node or the gNB-DU of the IAB-donor, to connect to the CU on the IAB-donor, and to connect to a core network.

Figure 3:
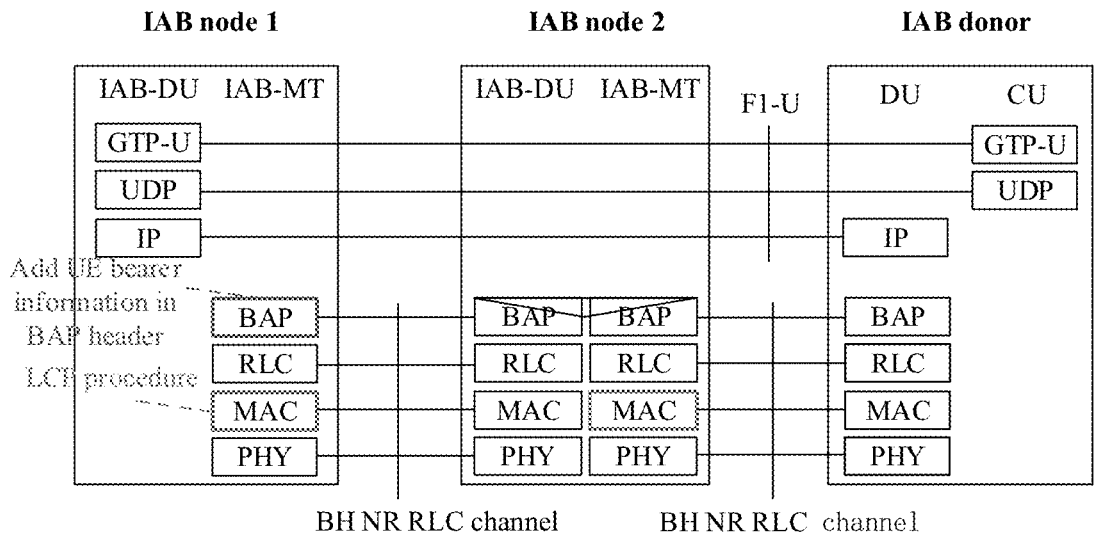
FIG. 3 is a schematic diagram of a protocol stack supporting an F1-U protocol in an embodiment of a first aspect of this disclosure.

FIG. 3 is a schematic diagram of a protocol stack supporting an F1-U protocol of the embodiment of this disclosure, showing a protocol stack for an F1-U between the IAB-DU and an IAB-donor-CU. As shown in FIG. 3, the F1-U is carried over two backhaul hops. The F1-U uses an IP transmission between the IAB-DU and the IAB-donor-CU. Reference may be made to 3GPP TS 38.470 for a definition of the IP transmission, which shall not be repeated herein any further.

Figure 4A:
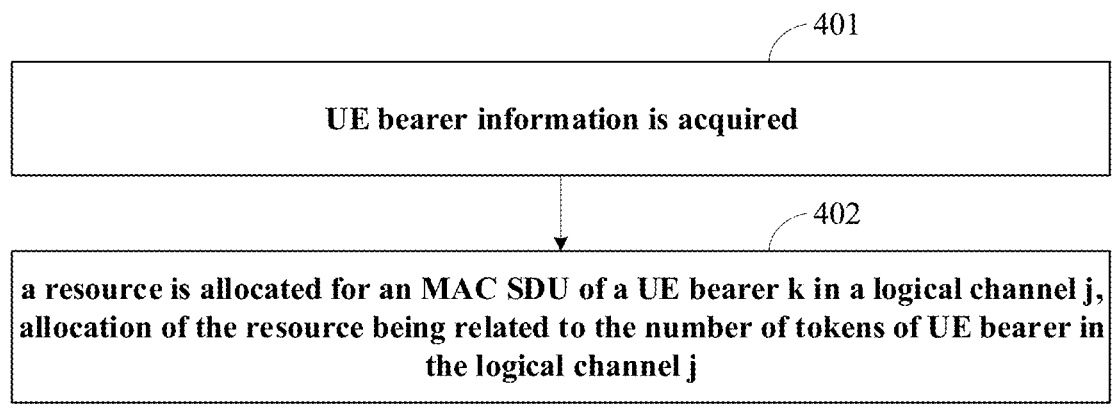
FIG. 4a is a schematic diagram of an example of the resource allocation method of the embodiment of the first aspect of this disclosure.

FIG. 4a is a schematic diagram of an example of the resource allocation method of the embodiment of this disclosure. The method is carried out on the IAB node, specifically on an MAC layer of an IAB-MT. As shown in FIG. 4a, the method includes:

401: UE bearer information is acquired; and

402: a resource is allocated for an MAC SDU of a UE bearer k in a logical channel j, allocation of the resource being related to the number of tokens of UE bearer in the logical channel j.

Figure 4B:
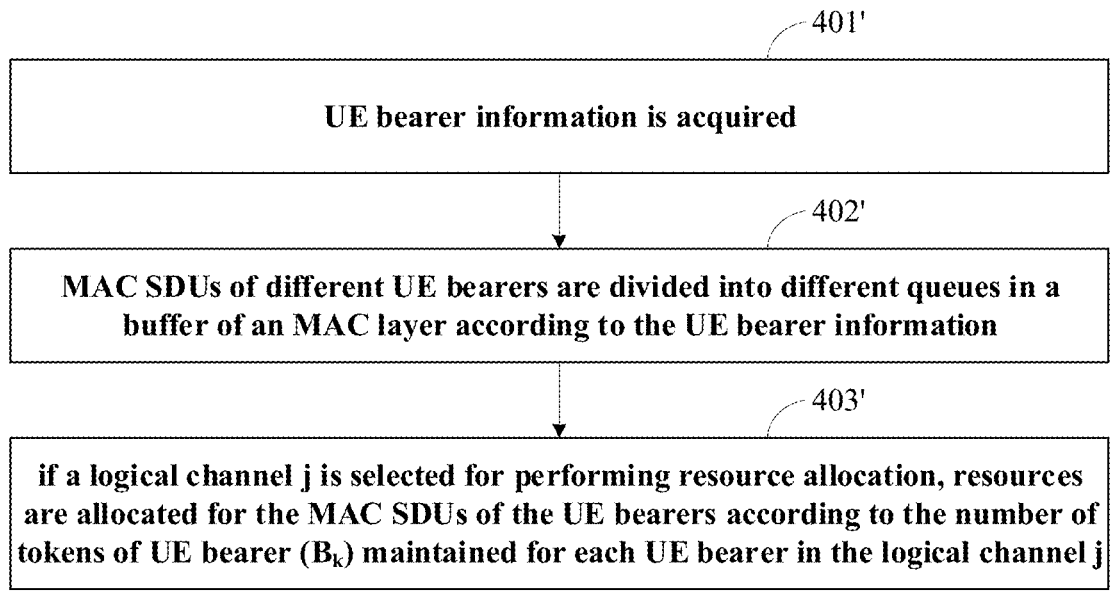
FIG. 4b is a schematic diagram of an example of the resource allocation method of the embodiment of the first aspect of this disclosure.

FIG. 4b is a schematic diagram of an example of the resource allocation method of the embodiment of this disclosure. The method is carried out on the IAB node, specifically on an MAC layer of an IAB-MT. As shown in FIG. 4b, the method includes:

401': UE bearer information is acquired;

402': MAC SDUs of different UE bearers are divided into different queues in a buffer of an MAC layer according to the UE bearer information; and 403': if a logical channel j is selected for performing resource allocation, resources are allocated for the MAC SDUs of the UE bearers according to the number of tokens of UE bearer ($B_k$) maintained for each UE bearer in the logical channel j.

In the embodiment of this disclosure, in order to support fairness of a UE bearer level, the UE bearer information is added to a BAP header. The MAC layer performs logical channel prioritization processing based on the number of tokens of a new UE bearer level (referred to as the number of tokens of UE bearer $B_k$). In the same logical channel, a resource allocation is performed to an MAC SDU of a UE bearer with a largest token number $B_k$. Therefore, no matter which mapping option from a DRB to a BH RLC channel is deployed in the multi-hop IAB network, fairness enhancement of UE uplink transmission may be provided, thereby supporting QoS.

In the embodiment of this disclosure, unless otherwise specified, "acquire" may be replaced with such terms as "obtain", "determine", etc., which have the same meaning.

In some embodiments, the method of the embodiment of this disclosure is applicable to a first IAB node on an upstream path of the IAB network (referred to as a first IAB node), also referred to as an access IAB node. The above UE bearer information is added to a BAP header of a BAP layer of the first IAB node and transferred from the BAP layer to an MAC layer of the first IAB node. Therefore, the MAC layer of the first IAB node may acquire the UE bearer information from the BAP layer. As shown in FIG. 3, for an IAB node 1 (the first IAB node), when the IAB-MT receives a BAP SDU (service data unit) from a higher layer, UE bearer information is added to the BAP header and transferred to the MAC layer.

In some embodiments, the method of the embodiment of this disclosure is applicable to an intermediate IAB node of the IAB network (referred to as a second IAB node), and the above UE bearer information is acquired by the second IAB node from the first IAB node. Therefore, an MAC layer of the second IAB node may acquire the UE bearer information from the first IAB node. A transfer process and mode of the UE bearer information from the first IAB node to the second IAB node are not limited in this disclosure, and reference may be made to relevant technologies. As shown in FIG. 3, for an IAB node 2 (the second IAB node), when the IAB-MT receives a BAP data PDU (protocol data unit) from a collocated BAP entity, i.e. a BAP entity on a collocated IAB-DU, the BAP layer reads the BAP header and transfers the UE bearer information in the BAP header to the MAC layer.

In the embodiment of this disclosure, as the BH RLC channel multiplexes multiple ingress/egress bearers from different UEs, each data block transmitted on the BH RLC channel needs to contain identifiers of the UEs and/or UE bearers. In this disclosure, the UE bearer information is added in the BAP header to facilitate realization of data buffering and scheduling at a UE bearer level.

In the embodiment of this disclosure, the UE bearer information may be a UE identifier, or a UE bearer identifier, or a TEID (tunnel endpoint ID) in a GTP-U header, or any combination of the above identifiers. The UE identifier may be formed by combining a PCI (physical cell identifier) and a C-RNTI (cell-radio network temporary identifier). The UE bearer identifier may be formed by combining the UE identifier and a DRB identifier. The BAP layer transfers the UE bearer information to the MAC layer. When the UE identifier is used as the UE bearer information, fairness of a UE level may be ensured. This is because that different DRBs of the same UE are usually mapped to different BH RLC channels, in which case the fairness of the UE level is in consistence with the fairness of the UE bearer level.

In the embodiment of this disclosure, with the UE bearer information, the MAC layer of the IAB-MT may perform enhancement of logical channel prioritization (LCP) by the processing in 402 or the processing in 402' and 403'.

In some embodiments, in the buffer of the MAC layer, different UE bearers are placed in different queues according to the UE bearer information, that is, each queue corresponds to one piece of UE bearer information, which reduces the granularity of the resource allocation compared with queuing based on logical channels.

In the embodiment of this disclosure, a new logical channel prioritization variable $B_k$ is introduced, $B_k$ being a variable that represents the number of tokens maintained for each UE bearer k (if there exist multiple UE bearers in the same logical channel j). That is, if there exist multiple UE bearers in logical channel j, $B_k$ represents the number of tokens of UE bearer k. In addition, according to 3GPP TS38.321, a variable representing the number of tokens is maintained for each logical channel, which is referred to as the number of tokens of logical channel in the embodiment of this disclosure. Taking logical channel j as an example, the number of tokens of logical channel j is expressed as $B_j$.

In some embodiments, multiple UE bearers in the same logical channel share the same logical channel configuration, such as a logical channel priority, a prioritized bit rate (PBR), a bucket size duration (BSD), that is, a bucket depth, etc.

In some embodiments, the above parameters may be configured by a network device via RRC (radio resource control) signaling. However, this disclosure is not limited thereto, and the above parameters may also be configured by other signaling or determined in other modes.

In the embodiment of this disclosure, in performing new transmission, if logical channel j is selected for performing resource allocation, resources are allocated for MAC SDUs of the UE bearers according to the number of tokens of UE bearer ($B_k$) maintained for each UE bearer (denoted by "k") in logical channel j.

For example, MAC SDUs in corresponding UE bearer queues in logical channel j are selected one by one, and $B_k$ and $B_j$ are updated when each MAC SDU is selected. If the number of tokens of logical channel ($B_j$) associated with logical channel j is greater than 0, a resource is allocated for an MAC SDU of a UE bearer with the maximum number of tokens of UE bearer ($B_k$) in logical channel j.

In the embodiment of this disclosure, after allocating the resource for the MAC SDU of the UE bearer k with the largest $B_k$ in logical channel j, a size of a served MAC SDU may be subtracted from the number of tokens of UE bearer ($B_k$), the size of the served MAC SDU may be subtracted from the number of tokens of logical channel ($B_j$), and then the process is circulated starting from the beginning, that is, the following processing is continued: if the number of tokens of logical channel ($B_j$) associated with logical channel j is greater than 0, allocating resources for the MAC SDU of the UE bearer with the maximum number of tokens of UE bearer ($B_k$) in logical channel j; subtracting the size of served MAC SDU from the number of tokens of UE bearer ($B_k$); subtracting the size of served MAC SDU from the number of tokens of logical channel ($B_j$), until either data for the logical channel j or uplink grant is exhausted, that is, the processing is stopped whichever is earlier.

In the embodiment of this disclosure, as the BAP layer has transferred the UE bearer information of each UE bearer (i.e., identification information of the MAC SDU of each UE bearer) to the MAC layer, the MAC layer may acquire the number of UE bearers contained in the logical channel j by counting the identifier information of MAC SDUs in the buffer, which is denoted by K in the embodiment of this disclosure.

In the embodiment of this disclosure, for each logical channel j containing K (K>=1) UE bearers, the MAC entity may,
  increase $B_k$ by PBR/K×T before performing an LCP process, where, T is a time since the last time of increase of $B_k$;
  and if a value of $B_k$ is greater than PBR/K×BSD, set $B_k$ to be of a bucket size (PBR/K×BSD) averagely allocated to each UE bearer.

In the embodiment of this disclosure, the above process may be understood as that a priority bit rate corresponding to $B_k$ is PBR/K, that is, 1/K of a priority bit rate configured for logical channel j, and a token bucket corresponding to each UE bearer is 1/K of the token bucket size of entire logical channel j.

In the embodiment of this disclosure, a mode and occasion of updating $B_j$ are in consistence with existing standards, which shall not be repeated herein any further.

It should be noted that FIGS. 4a and 4b only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIGS. 4a and 4b.

Figure 5A:
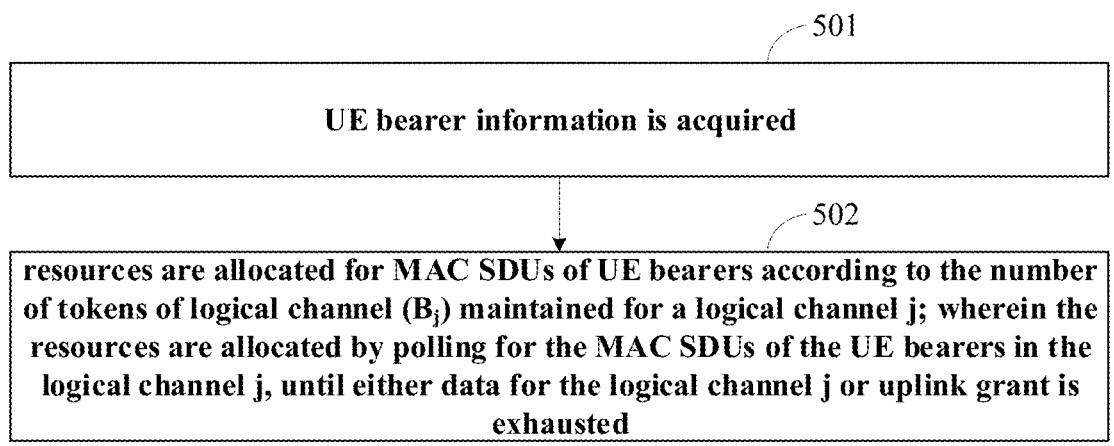
FIG. 5a is a schematic diagram of another example of the resource allocation method of the embodiment of the first aspect of this disclosure.

FIG. 5a is a schematic diagram of another example of the resource allocation method of the embodiment of this disclosure. The method is carried out on the MAC layer of the IAB node. As shown in FIG. 5a, the method includes:

501: UE bearer information is acquired;

502: resources are allocated for MAC SDUs of UE bearers according to the number of tokens of logical channel ($B_j$) maintained for a logical channel j, wherein the resources are allocated by round robin for the MAC SDUs of the UE bearers in the logical channel j, until either data for the logical channel j or uplink grant is exhausted.

Figure 5B:
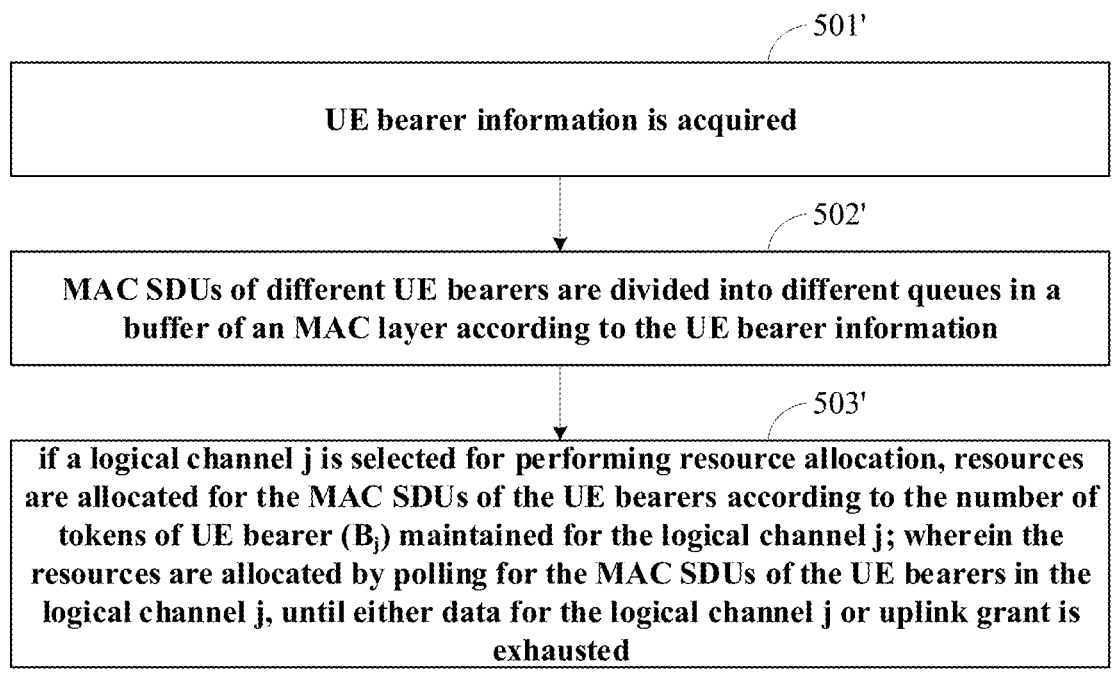
FIG. 5b is a schematic diagram of another example of the resource allocation method of the embodiment of the first aspect of this disclosure.

FIG. 5b is a schematic diagram of another example of the resource allocation method of the embodiment of this disclosure. The method is carried out on the MAC layer of the IAB node. As shown in FIG. 5b, the method includes:

501': UE bearer information is acquired;

502': MAC SDUs of different UE bearers are divided into different queues in a buffer of an MAC layer according to the UE bearer information; and

503': if a logical channel j is selected for performing resource allocation, resources are allocated for the MAC SDUs of the UE bearers according to the number of tokens of UE bearer ($B_j$) maintained for the logical channel j, wherein the resources are allocated by round robin for the MAC SDUs of the UE bearers in the logical channel j, until either data for the logical channel j or uplink grant is exhausted.

In the example of FIG. 5b, implementations of 501' and 502' are identical to those of 401' and 402' in the method shown in FIG. 4b, the contents of which being incorporated herein, and being not going to be described herein any further.

In the example of FIG. 5b, different from the method shown in FIG. 4b, in 503', the variable $B_j$ is still maintained for each logical channel j, and in allocating resources for logical channel j, MAC SDUs of different UE bearers are served by round robin. That is, the MAC SDUs of different UE bearers are selected in round robin and resources are allocated therefor, until either data for logical channel j or uplink (UL) grant is exhausted, and the processing is stopped whichever is earlier.

In the embodiment of this disclosure, similar to the method shown in FIGS. 4a and 4b, the method shown in FIGS. 5a and 5b may be applied to both the first IAB node in the IAB network and the second IAB node in the IAB network, that is, the method shown in FIGS. 5a and 5b may be carried out by the first IAB node in the IAB network at the MAC layer, and may also be carried out by the second IAB node in the IAB network at the MAC layer. Definitions of the first IAB node and the second IAB node are as described above, which shall not be described herein any further.

It should be noted that FIGS. 5a and 5b only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIGS. 5a and 5b.

According to method of the embodiment of this disclosure, fairness between users having identical QoS demands in the multi-hop IAB network may be ensured.

Embodiment of a Second Aspect

The embodiment of this disclosure provides a resource allocation method, which shall be described from a side of an IAB node in an IAB network.

In the embodiment of this disclosure, a definition of the IAB node and a structure of a protocol stack supporting the F1-U protocol are identical to those in the embodiment of the first aspect, the contents of which being incorporated herein, and being not going to be described herein any further.

Figure 6A:
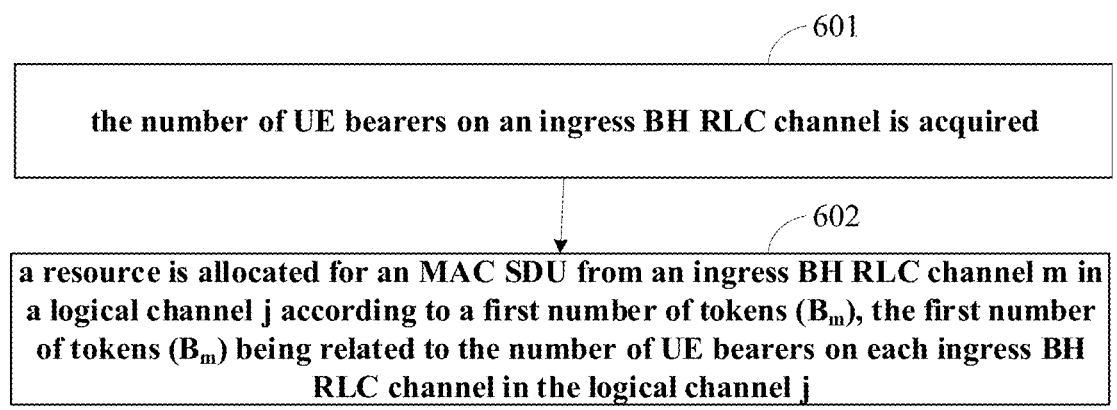
FIG. 6a is a schematic diagram of the resource allocation method of the embodiment of the second aspect of this disclosure.

FIG. 6a is a schematic diagram of an example of the resource allocation method of the embodiment of this disclosure. The method is carried out on an MAC layer of the IAB node. As shown in FIG. 6a, the method includes:

601: the number of UE bearers on an ingress BH RLC channel is acquired; and

602: a resource is allocated for an MAC SDU from an ingress BH RLC channel m in a logical channel j according to a first number of tokens ($B_m$), the first number of tokens ($B_m$) being related to the number of UE bearers on each ingress BH RLC channel in the logical channel j.

Figure 6B:
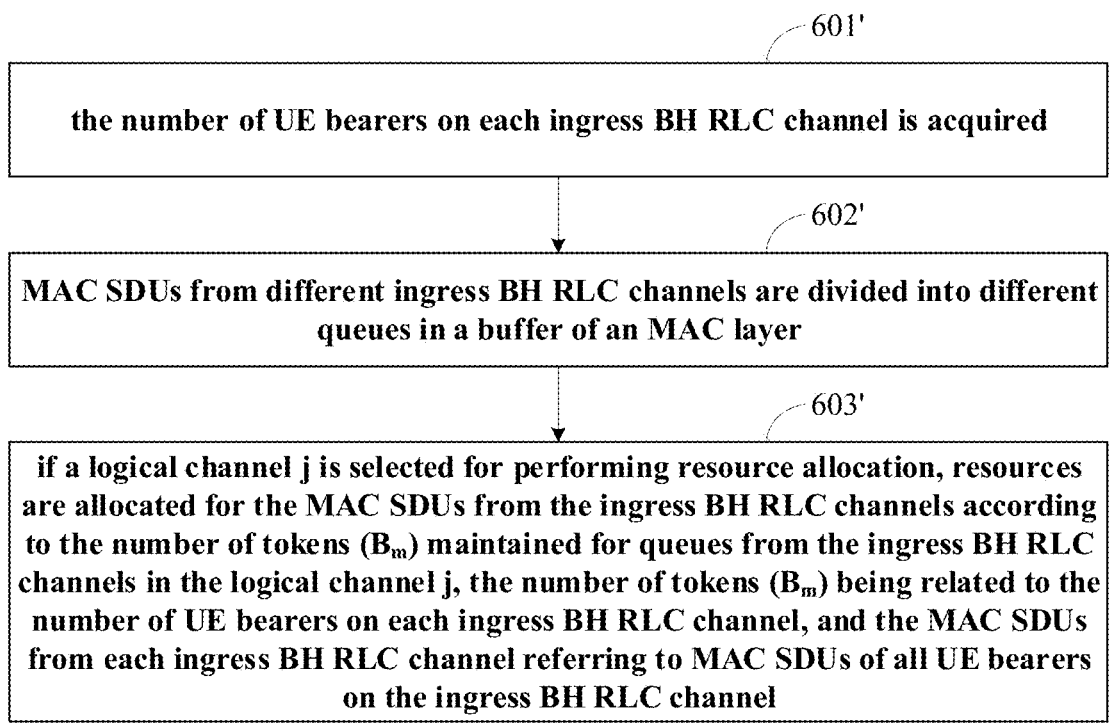
FIG. 6b is a schematic diagram of the resource allocation method of the embodiment of the second aspect of this disclosure.

FIG. 6b is a schematic diagram of an example of the resource allocation method in the embodiment of this disclosure. The method is carried out on an MAC layer of the IAB node. As shown in FIG. 6b, the method includes:

601': the number of UE bearers on each ingress BH RLC channel is acquired;

602': MAC SDUs from different ingress BH RLC channels are divided into different queues in a buffer of an MAC layer; and

603': if a logical channel j is selected for performing resource allocation, resources are allocated for the MAC SDUs from the ingress BH RLC channels according to the number of tokens ($B_m$) maintained for queues from the ingress BH RLC channels in the logical channel j, the number of tokens ($B_m$) being related to the number of UE bearers on each ingress BH RLC channel, and the MAC SDUs from each ingress BH RLC channel referring to MAC SDUs of all UE bearers on the ingress BH RLC channel.

In the embodiment of this disclosure, the first number of tokens ($B_m$) in FIG. 6a has the same meaning as that of the number of tokens ($B_m$) in FIG. 6b. For the sake of convenience of explanation, in the following description, they are marked by the number of tokens ($B_m$).

In the embodiment of this disclosure, the IAB node acquires information on the number of UE carriers carried on each BH RLC channel. The MAC layer configures a token number (denoted by $B_m$) for each ingress BH RLC channel m mapped to the same logical channel. Resources are allocated for an MAC SDU from an ingress BH RLC channel with the current maximum number of tokens $B_m$. Therefore, no matter which option of mapping from a DRB to a BH RLC channel is deployed in the multi-hop IAB network, fairness enhancement of UE uplink transmission may be provided, thereby supporting QoS.

Figure 7:
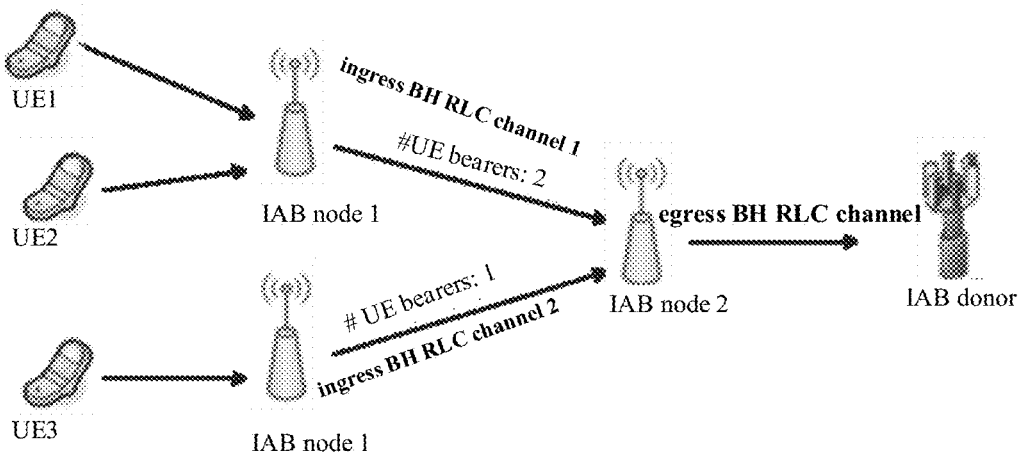
FIG. 7 is a schematic diagram of an example of the number of UE bearers on a BH RLC channel.

FIG. 7 is a schematic diagram of an example of the number of UE bearers on a BH RLC channel, showing the number of UE bearers on an ingress BH RLC channel of uplink data for IAB node 2 (the second IAB node). In FIG. 7, it is assumed that each UE has a DRB, priorities of DRBs of all UEs are identical, DRBs of UE1 and UE2 are mapped to the same BH RLC channel, and a DRB of UE3 is mapped to another BH RLC channel, while they are mapped to the same egress BH RLC channel at IAB node 2. That is, the number of UE bearers from ingress BH RLC channel 1 is 2, while the number of UE bearers from ingress BH RLC channel 2 is 1.

In some embodiments, the method of the embodiment of this disclosure is applicable to an intermediate IAB node (referred to as a second IAB node) of the IAB network. As shown in FIG. 3 and FIG. 7, for IAB node 2 (the second IAB node), when the IAB-MT receives a BAP Data PDU from a collocated BAP entity, a BAP layer transfers an identifier of an ingress BH RLC channel from which the data come to the MAC layer. Thus, the MAC layer may learn which queue where each MAC SDU should be placed.

In the embodiment of this disclosure, the number of UE bearers on each ingress BH RLC channel is acquired, and the MAC layer of the IAB-MT may perform enhancement of logical channel prioritization via the processing in 602 or the processing in 602' and 603'.

In some embodiments, MAC SDUs from different ingress BH RLC channels are placed in different queues in the MAC layer buffer, that is, each queue corresponds to an ingress BH RLC channel.

In the embodiment of this disclosure, a variable $B_m$ is introduced, $B_m$ being a variable that represents the number of tokens maintained for each ingress BH RLC (if there exist multiple ingress BH RLC channels corresponding to the same logical channel j). That is, if multiple ingress BH RLC channels are mapped to logical channel j, $B_m$ represents the number of tokens for ingress BH RLC channel m. In addition, according to 3GPP TS38.321, a variable representing the number of tokens is maintained for each logical channel, which is referred to as the number of tokens of logical channel in the embodiment of this disclosure. Taking logical channel j as an example, the number of tokens of logical channel j is expressed as $B_j$.

In some embodiments, MAC SDUs from different ingress BH RLC channels in the same logical channel share the same logical channel configuration, such as a logical channel priority, a prioritized bit rate (PBR), a bucket size duration (BSD), that is, a bucket depth, etc.

In some embodiments, the above parameters may be configured by a network device via RRC (radio resource control) signaling. However, this disclosure is not limited thereto, and the above parameters may also be configured by other signaling or determined in other modes.

In the embodiment of this disclosure, in performing new transmission, if logical channel j is selected for performing resource allocation, resources are allocated for MAC SDUs of the ingress BH RLC channels according to the number of tokens ($B_m$) maintained for queues from the ingress BH RLC channels m in logical channel j. Here, the number of tokens ($B_m$) is related to the number of UE bearers on each ingress BH RLC channel, and the MAC SDUs from each ingress BH RLC channel refer to MAC SDUs of all UE bearers from the ingress BH RLC channel.

For example, MAC SDUs in the queues from the ingress BH RLC channels are selected one by one, and $B_m$ and $B_j$ are updated when each MAC SDU is selected. If the number of tokens of logical channel ($B_j$) associated with logical channel j is greater than 0, a resource is allocated for an MAC SDU in a queue of an ingress BH RLC channel with the maximum number of tokens ($B_m$) in logical channel j.

In the embodiment of this disclosure, after allocating the resource for the MAC SDU in the queue of the ingress BH RLC channel with the maximum number of tokens ($B_m$) in logical channel j, a size of a served MAC SDU may be subtracted from the number of tokens ($B_m$), the size of the served MAC SDU may be subtracted from the number of tokens of logical channel ($B_j$), and then the process is circulated starting from the beginning, that is, the following processing is continued: if the number of tokens of logical channel ($B_j$) associated with logical channel j is greater than 0, allocating resources for the MAC SDU of the ingress BH RLC channel with the maximum number of tokens ($B_m$) in logical channel j; subtracting the size of served MAC SDU from the number of tokens ($B_m$); subtracting the size of served MAC SDU from the number of tokens of logical channel ($B_j$), until either data for the logical channel j or uplink grant is exhausted, that is, the processing is stopped whichever is earlier.

In the embodiment of this disclosure, $k_m$ is defined as the number of UE bearers from the ingress BH RLC channel m, and K is defined as the number of all UE bearers on logical channel j. K may be acquired via configuration of a BH RLC channel corresponding to logical channel j (i.e. an egress BH RLC channel), and may also be acquired by counting the number of UE bearers on all ingress BH RLC channels corresponding to a data source of logical channel j, which is not limited in this disclosure.

In the embodiment of this disclosure, for each logical channel j containing MAC SDUs from multiple BH RLC channels, the MAC entity may, increase $B_m$ by $PBR \times k_m / K \times T$ before each time of performing an LCP process, where, T is a time since the last time of increase of $B_m$;

and if a value of $B_m$ is greater than $PBR \times k_m / K \times BSD$, set $B_m$ to be of a bucket size ($PBR \times k_m / K \times B SD$) proportionally allocated to the queues from each ingress BH RLC channel. In the embodiment of this disclosure, the above process may be understood as that a priority bit rate corresponding to $B_m$ is $PBR \times k_m / K$, that is, $k_m/K$ of a priority bit rate configured by logical channel j, and a token bucket corresponding to each ingress BH RLC channel is $k_m/K$ of the token bucket size of entire logical channel j.

In the embodiment of this disclosure, a mode and occasion of updating B are in consistence with existing standards, which shall not be repeated herein any further.

In the embodiment of this disclosure, in 601 and 601', the number of UE bearers on the ingress BH RLC channel may be acquired in any implementable method. For example, the IAB node (the second IAB node) may receive configuration information used for indicating the number of UE bearers on the BH RLC channel from the IAB-donor, and acquire the number of UE bearers on the ingress BH RLC channel according to the configuration information.

In the embodiment of this disclosure, as the second IAB node needs to acquire information on the number of UE bearers carried on each BH RLC channel, the second IAB node may be updated every time the number of UE bearers on a BH RLC channel changes.

In some embodiments, the above configuration information is implemented by an F1AP (F1 application protocol) from the IAB-donor. For example, a CU of the IAB-donor transmits configuration information of the BH RLC channel to an IAB-DU of the above IAB node via the F1AP, the configuration information containing the number of UE bearers on the BH RLC channel.

In some embodiments, the above configuration information is implemented by RRC signaling from the IAB-donor. For example, a CU of the IAB-donor transmits logical channel configuration information to the IAB-MT of the above IAB node via an RRC message, the logical channel configuration information containing the number of UE bearers on a BH RLC channel corresponding to the logical channel.

The above two modes for acquiring the configuration information are illustrative only, and update of the number of UE bearers on the BH RLC channel may also be implemented in other implementable modes. It should be noted that FIGS. 6a and 6b only schematically illustrates the embodiment of this disclosure; however, this disclosure is not limited thereto. For example, an order of execution of the steps may be appropriately adjusted, and furthermore, some other steps may be added, or some steps therein may be reduced. And appropriate variants may be made by those skilled in the art according to the above contents, without being limited to what is contained in FIGS. 6a and 6b.

According to method of the embodiment of this disclosure, fairness between users having identical QoS demands in the multi-hop IAB network may be ensured.

Embodiment of a Third Aspect

The embodiment of this disclosure provides a resource allocation apparatus, which may be, for example, an IAB node in an IAB network, or one or more components or assemblies configured in an IAB node.

Figure 8A:
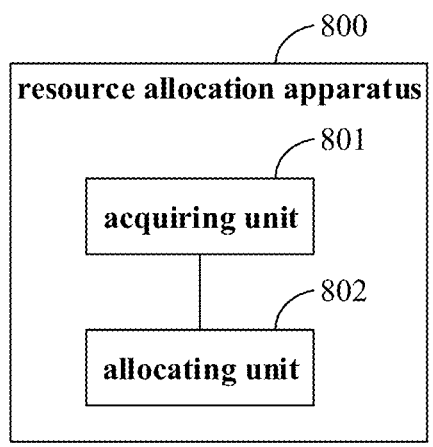
FIG. 8a is a schematic diagram of an example of the resource allocation apparatus of the embodiment of the third aspect of this disclosure.

FIG. 8a is a schematic diagram of an example of the resource allocation apparatus of the embodiment of this disclosure. As shown in FIG. 8a, a resource allocation apparatus 800 of the embodiment of this disclosure includes:
  an acquiring unit 801 configured to acquire UE bearer information; and
  an allocating unit 802 configured to allocate a resource for an MAC SDU of a UE bearer k in a logical channel j, allocation of the resource being related to the number of tokes of UE bearer in the logical channel j.

Figure 8B:
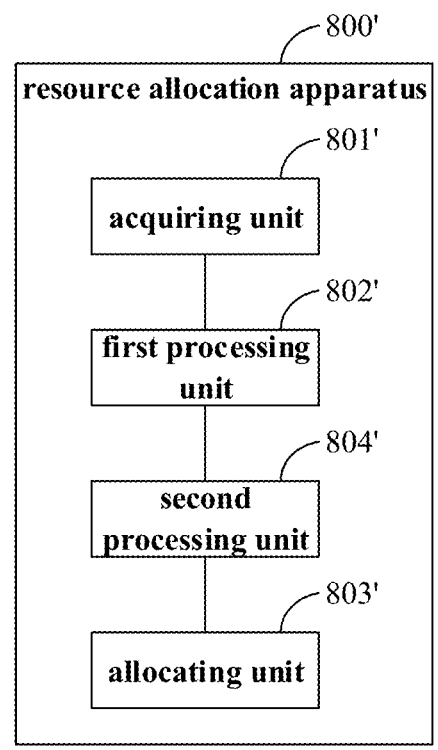
FIG. 8b is a schematic diagram of an example of the resource allocation apparatus of the embodiment of the third aspect of this disclosure.

FIG. 8b is a schematic diagram of an example of the resource allocation apparatus of the embodiment of this disclosure. As principles of the apparatus for solving problems are similar to the method of FIG. 4b of the embodiment of the first aspect, reference may be made to the implementation of the method of FIG. 4b of the embodiment of the first aspect, with identical contents being not going to be described herein any further.

As shown in FIG. 8b, a resource allocation apparatus 800' of the embodiment of this disclosure includes:
  an acquiring unit 801' configured to acquire UE bearer information;
  a first processing unit 802' configured to divide MAC SDUs of different UE bearers into different queues in a buffer of an MAC layer according to the UE bearer information; and
  an allocating unit 803' configured to, if a logical channel j is selected for performing resource allocation, allocate resources for the MAC SDUs of the UE bearers according to the number of tokens of UE bearer ($B_k$) maintained for each UE bearer k in the logical channel j.

In some embodiments, the resource allocation apparatus 800' is applicable to a first IAB node in an IAB network. The first IAB node is a first IAB node on an upstream path of the IAB network. The UE bearer information is added to a BAP header of a BAP layer of the first IAB node, and is transferred from the BAP layer to an MAC layer of the first IAB node.

In some embodiments, the resource allocation apparatus 800' is applicable to a second IAB node in the IAB network. The second IAB node is an intermediate IAB node in the IAB network. The UE bearer information is acquired by the second IAB node from the first IAB node. The first IAB node is a first IAB node on an upstream path of the IAB network.

In some embodiments, the UE bearer information is at least one of the following:
  a UE ID;
  a UE bearer ID; or
  a TEID.

In some embodiments, all UE bearers in the logical channel j share the same logical channel configuration.

In some embodiments, the logical channel configuration includes at least one of the following:
  a logical channel priority;
  a prioritized bit rate (PBR); or
  a bucket size duration (BSD).

In some embodiments, the logical channel configuration is configured by a network device via radio resource control (RRC) signaling.

In some embodiments, the allocating unit 802/803' cyclically performs the following processing, until either data for the logical channel j or uplink grant is exhausted:
  if the number of tokens of logical channel ($B_j$) associated with logical channel j is greater than 0, allocating resources for the MAC SDU of the UE bearer with the maximum number of tokens of UE bearer ($B_k$) in logical channel j;
  subtracting the size of served MAC SDU from the number of tokens of UE bearer ($B_k$); and
  subtracting the size of served MAC SDU from the number of tokens of logical channel ($B_j$).

In some embodiments, as shown in FIG. 8b, the resource allocation apparatus 800' further includes:
  a second processing unit 804' configured to increase the number of tokens of UE bearer ($B_k$) by PBR/K×T, and if a resulted value of the number of tokens of UE bearer ($B_k$) is greater than a size of a UE bearer token bucket, set the value of the number of tokens of UE bearer ($B_k$) to be of the size of the UE bearer token bucket, wherein K is a total number of UE bearers in the logical channel j, and T is an elapsed time since last increasing the number of tokens of UE bearer ($B_k$).

In some embodiments, a size of the UE bearer token bucket is: PBR/K×BSD.

Figure 9A:
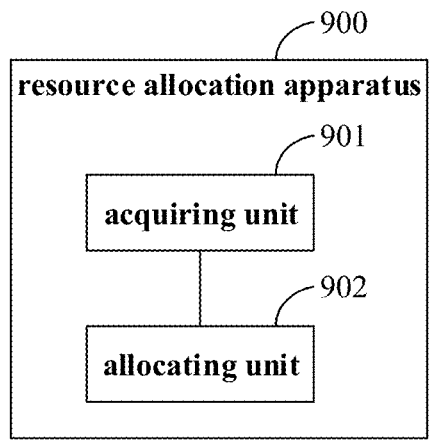
FIG. 9a is a schematic diagram of another example of the resource allocation apparatus of the embodiment of the third aspect of this disclosure.

FIG. 9a is a schematic diagram of another example of the resource allocation apparatus of the embodiment of this disclosure. As shown in FIG. 9a, a resource allocation apparatus 900 of the embodiment of this disclosure includes:
  an acquiring unit 901 configured to acquire UE bearer information;
  an allocating unit 902 configured to allocate resources for MAC SDUs of UE bearers according to the number of tokens of logical channel ($B_j$) maintained for a logical channel j, wherein the resources are allocated by round robin for the MAC SDUs of the UE bearers in the logical channel j, until either data for the logical channel j or uplink grant is exhausted.

Figure 9B:
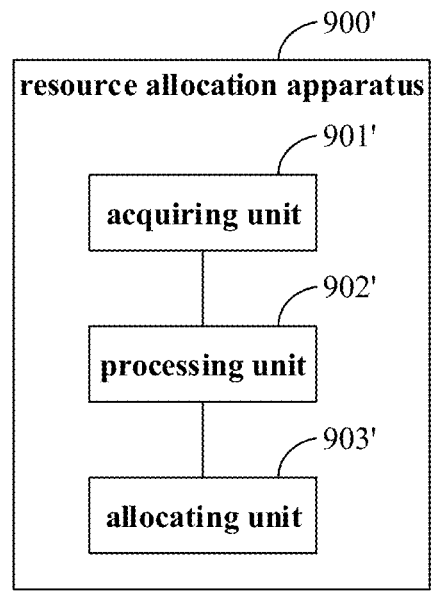
FIG. 9b is a schematic diagram of another example of the resource allocation apparatus of the embodiment of the third aspect of this disclosure.

FIG. 9b is a schematic diagram of another example of the resource allocation apparatus of the embodiment of this disclosure. As principles of the apparatus for solving problems are similar to the method of FIG. 5b of the embodiment of the first aspect, reference may be made to the implementation of the method of FIG. 5b of the embodiment of the first aspect, with identical contents being not going to be described herein any further.

As shown in FIG. 9b, a resource allocation apparatus 900' of the embodiment of this disclosure includes:
  an acquiring unit 901' configured to acquire UE bearer information;
  a processing unit 902' configured to divide MAC SDUs of different UE bearers into different queues in a buffer of an MAC layer according to the UE bearer information; and
  an allocating unit 903' configured to, if a logical channel j is selected for performing resource allocation, allocate resources for the MAC SDUs of the UE bearers according to the number of tokens of logical channel ($B_j$) maintained for the logical channel j, wherein the resources are allocated by round robin for the MAC SDUs of the UE bearers in the logical channel j, until either data for the logical channel j or uplink grant is exhausted.

In some embodiments, the resource allocation apparatus is applicable to a first IAB node or a second IAB node in an IAB network, the second IAB node being an intermediate IAB node in the IAB network.

It should be noted that the components or modules related to this disclosure are only described above. However, this disclosure is not limited thereto, and the resource allocation apparatus 800/800'/900/900' of the embodiment of this disclosure may further include other components or modules, and reference may be made to related techniques for particulars of these components or modules. For example, the apparatus 800 may further include the above second processing unit 804'.

Furthermore, for the sake of simplicity, connection relationships between the components or modules or signal profiles thereof are only illustrated in FIGS. 8a, 8b, 9a and 9b. However, it should be understood by those skilled in the art that such related techniques as bus connection, etc., may be adopted. And the above components or modules may be implemented by hardware, such as a processor, a memory, a transmitter, and a receiver, which are not limited in the embodiment of this disclosure.

According to method of the embodiment of this disclosure, fairness between users having identical QoS demands in the multi-hop IAB network may be ensured.

Embodiment of a Fourth Aspect

The embodiment of this disclosure provides a resource allocation apparatus, which may be, for example, an intermediate IAB node in an IAB network, or one or more components or assemblies configured in an intermediate IAB node.

Figure 10A:
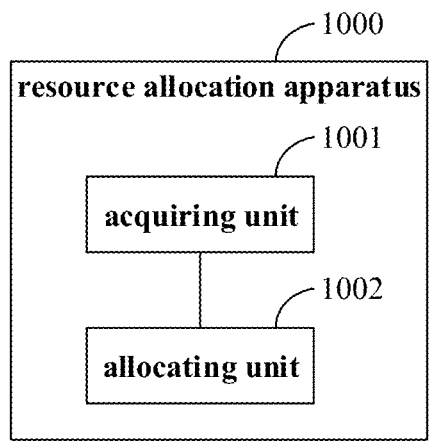
FIG. 10a is a schematic diagram of the resource allocation apparatus of the embodiment of the fourth aspect of this disclosure.

FIG. 10a is a schematic diagram of the resource allocation apparatus of the embodiment of this disclosure. As shown in FIG. 10a, a resource allocation apparatus 1000 of the embodiment of this disclosure includes:

an acquiring unit 1001 configured to acquire the number of UE bearers on an ingress BH RLC channel; and an allocating unit 1002 configured to allocate a resource for an MAC SDU from an ingress BH RLC channel m in a logical channel j according to a first number of tokens ($B_m$), the first number of tokens ($B_m$) being related to the number of UE bearers on each ingress BH RLC channel in the logical channel j.

Figure 10B:
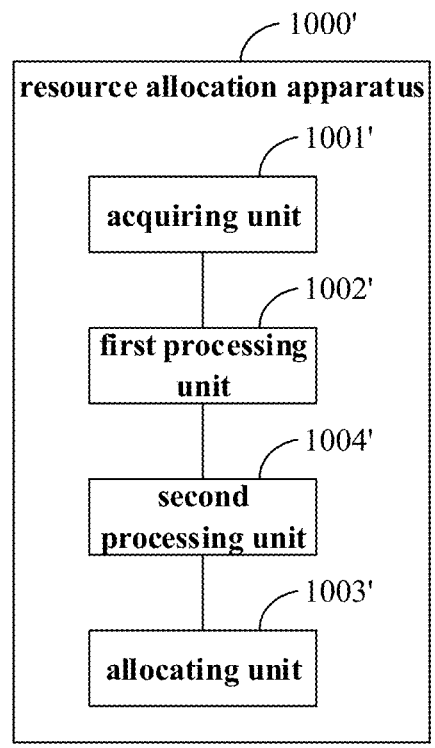
FIG. 10b is a schematic diagram of the resource allocation apparatus of the embodiment of the fourth aspect of this disclosure.

FIG. 10b is a schematic diagram of the resource allocation apparatus of the embodiment of this disclosure. As principle of the apparatus for solving problems are similar to the method of the embodiment of the second aspect, reference may be made to the implementation of the method the embodiment of the second aspect, with identical contents being not going to be described herein any further.

As shown in FIG. 10b, a resource allocation apparatus 1000' of the embodiment of this disclosure includes:

an acquiring unit 1001' configured to acquire the number of UE bearers on each ingress BH RLC channel;

a first processing unit 1002' configured to divide MAC SDUs from different ingress BH RLC channels into different queues in a buffer of an MAC layer; and an allocating unit 1003' configured to, if a logical channel j is selected for performing resource allocation, allocate resources for the MAC SDUs from the ingress BH RLC channels according to the number of tokens ($B_m$) maintained for queues from the ingress BH RLC channels m in the logical channel j, the number of tokens ($B_m$) being related to the number of UE bearers on each ingress BH RLC channel, and the MAC SDUs from each ingress BH RLC channel referring to MAC SDUs of all UE bearers on the ingress BH RLC channel.

In the embodiment of this disclosure, a meaning of the first number of tokens ($B_m$) in FIG. 10a is identical to that of the number of tokens ($B_m$) in FIG. 10b.

In some embodiments, the resource allocation apparatus 1000/1000' is/are applicable to a second IAB node in the IAB network, the second IAB node being an intermediate IAB node in the IAB network.

In some embodiments, MAC SDUs of the logical channel j from different ingress BH RLC channels share the same logical channel configuration. For example, logical channel configuration of data from a first BH RLC channel in logical channel j is identical to logical channel configuration of data from a second BH RLC channel in logical channel j, and the identical logical channel configurations are logical channel configuration of logical channel j.

In some embodiments, the logical channel configuration includes at least one of the following:

a logical channel priority;

a prioritized bit rate (PBR); or a bucket size duration (BSD).

In some embodiments, the logical channel configuration is configured by a network device via radio resource control (RRC) signaling.

In some embodiments, the allocating unit 1002/1003' cyclically performs the following processing, until either data for the logical channel j or uplink grant is exhausted:

allocating a resource for an MAC SDU from the ingress BH RLC channel having a maximum number of tokens ($B_m$) in the logical channel j if the number of tokens of logical channel ($B_j$) associated with the logical channel j is greater than 0;

subtracting the number of tokens ($B_m$) by a size of a served MAC SDU; and subtracting the number of tokens of logical channel ($B_j$) by the size of the served MAC SDU.

In some embodiments, as shown in FIG. 10b, the resource allocation apparatus 1000' further includes:

a second processing unit 1004' configured to increase the number of tokens ($B_m$) by $PBR \times k_m / K \times T$, and if a resulted value of the number of tokens ($B_m$) is greater than a size of a token bucket, set the value of the number of tokens ($B_m$) to be of the size of the token bucket, wherein $k_m$ is the number of UE bearers on each ingress BH RLC channel m, K is a total number of UE bearers in the logical channel j, and T is an elapsed time since last increasing the number of tokens ($B_m$).

In some embodiments, the size of the token bucket is $PBR \times k_m / K \times BSD$.

In some embodiments, the acquiring unit 1001' receives configuration information used for indicating the number of UE bearers on a BH RLC channel from an IAB donor.

In some embodiments, the configuration information is provided by the IAB donor via an F1AP or provided by the IAB donor via RRC signaling.

It should be noted that the components or modules related to this disclosure are only described above. However, this disclosure is not limited thereto, and the resource allocation apparatus 1000/1000' of the embodiment of this disclosure may further include other components or modules, and reference may be made to related techniques for particulars of these components or modules. For example, the apparatus 1000 may further include the above second processing unit 1004'.

Furthermore, for the sake of simplicity, connection relationships between the components or modules or signal profiles thereof are only illustrated in FIGS. 10*a* and 10*b*. However, it should be understood by those skilled in the art that such related techniques as bus connection, etc., may be adopted. And the above components or modules may be implemented by hardware, such as a processor, a memory, a transmitter, and a receiver, which are not limited in the embodiment of this disclosure.

According to method of the embodiment of this disclosure, fairness between users having identical QoS demands in the multi-hop IAB network may be ensured.

Embodiment of a Fifth Aspect

Figure 11:
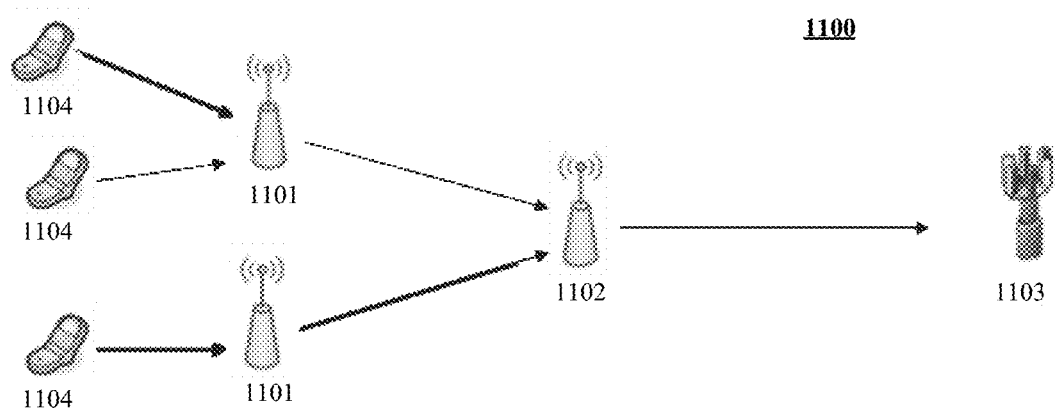
FIG. 11 is a schematic diagram of the communication system of the embodiment of the fifth aspect of this disclosure.

The embodiment of this disclosure provides a communication system. FIG. 11 is a schematic diagram of a communication system 1100. As shown in FIG. 11, the communication system 1100 includes first IAB nodes 1101 and a second IAB node 1102. The above first IAB nodes are first IAB nodes on an uplink path, and the above second IAB node is an intermediate IAB node. In addition, in some embodiments, as shown in FIG. 11, the communication system 1100 may further include an IAB donor node 1103. Moreover, in some embodiments, as shown in FIG. 11, the communication network 1100 may include terminal equipments 1104. For the sake of simplicity, description is given in FIG. 11 by taking only three terminal equipments 1104, two first IAB nodes 1101, one second IAB node 1102 and one IAB donor node as examples; however, the embodiment of this disclosure is not limited thereto. Reference may be made to relevant technologies for network architectures of the terminal equipments 1104, the first IAB nodes 1101, the second IAB node 1102 and the IAB donor node 1103, which shall not be described herein any further.

In the embodiment of this disclosure, existing traffics or traffics that may be implemented in the future may be performed between the IAB donor node 1103 and the terminal equipments 1104 via the first IAB nodes 1101 and the second IAB node 1102. For example, such traffics may include but not limited to enhanced mobile broadband (eMBB), massive machine type communication (MTC), ultra-reliable and low-latency communication (URLLC), and vehicle to everything (V2X), etc.

In some embodiments, the first IAB nodes 1101 and the second IAB node are configured to execute the method described in the embodiment of the first aspect. In some embodiments, the second IAB node 1102 is configured to execute the method described in the embodiment of the second aspect. Reference may be made to the embodiments of the first aspect to the fourth aspect for relevant contents of the first IAB nodes 1101 and the second IAB node 1102, which shall not be described herein any further.

The embodiment of this disclosure further provides an IAB node.

Figure 12:
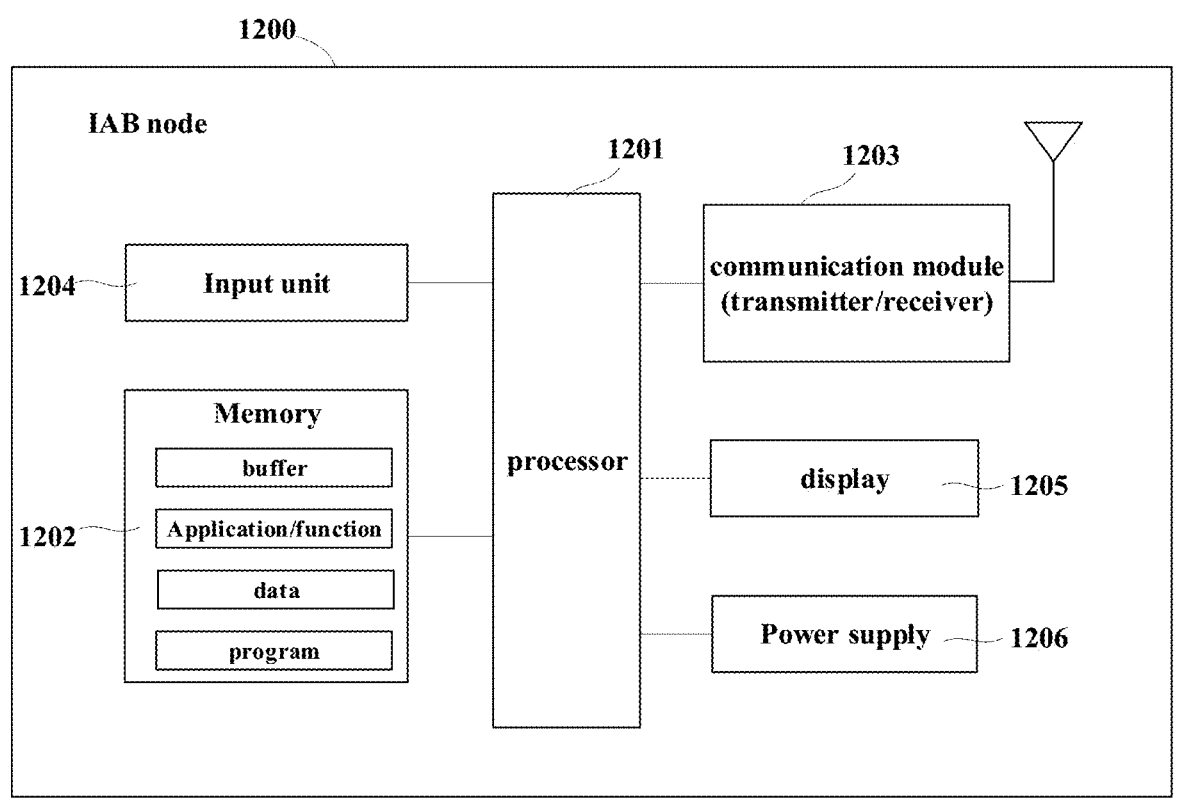
FIG. 12 is a schematic diagram of an IAB node of the embodiment of the fifth aspect of this disclosure.

FIG. 12 is a schematic diagram of the IAB node in the embodiment of this disclosure. As shown in FIG. 12, an IAB node 1200 may include a processor 1201 and a memory 1202, the memory 1202 storing data and programs and being coupled to the processor 1201. It should be noted that this figure is illustrative only, and other types of structures may also be used, so as to supplement or replace this structure and achieve a telecommunications function or other functions.

For example, the processor 1201 may be configured to execute the programs to implement methods as described in the embodiment of the first or second aspect.

As shown in FIG. 12, the IAB node 1200 may further include: a communication module 1203, an input unit 1204, a display 1205, and a power supply 1206, wherein functions of the above components are similar to those in the related art, which shall not be described herein any further. It should be noted that the IAB node 1200 does not necessarily include all the parts shown in FIG. 12, and the above components are not necessary. Furthermore, the IAB node 1200 may include parts not shown in FIG. 12, and the related art may be referred to.

An embodiment of this disclosure provides a computer readable program, which, when executed in an IAB node, will cause a computer to carry out the method as described in the embodiment of the first or second aspect in the IAB node.

An embodiment of this disclosure provides a storage medium storing a computer readable program, which will cause a computer to carry out the method as described in the embodiment of the first or second aspect in an IAB node.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, an EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

As to the above implementations disclosed in the embodiments, following supplements are further disclosed.

1. A resource allocation method, wherein the method includes:
   S1: acquiring UE bearer information;
   S2: dividing MAC SDUs of different UE bearers into different queues in a buffer of an MAC layer according to the UE bearer information; and
   S3: if a logical channel j is selected for performing resource allocation, allocating resources for the MAC SDUs of the UE bearers according to the number of tokens of UE bearer ($B_k$) maintained for each UE bearer k in the logical channel j.

2. The method according to supplement 1, wherein the method is applicable to a first IAB node in an IAB network, the first IAB node being a first IAB node on an upstream path of the IAB network, the UE bearer information is added to a BAP header of a BAP layer of the first IAB node and transferred from the BAP layer to an MAC layer of the first IAB node.

3. The method according to supplement 1, wherein the method is applicable to a second IAB node in the IAB network, the second IAB node being an intermediate IAB node of the IAB network, the UE bearer information is radio resource acquired by the second IAB node from the first IAB node, and the first IAB node is a first IAB node on an upstream path of the IAB network.

4. The method according to supplement 1, wherein the UE bearer information is at least one of the following:
   a UE ID;
   a UE bearer ID; or
   a TEID.

5. The method according to supplement 1, wherein all UE bearers in the logical channel j share the same logical channel configuration.

5.1. The method according to supplement 5, wherein the logical channel configuration includes at least one of the following:
   a logical channel priority;
   a prioritized bit rate (PBR); or
   a bucket size duration (BSD).

5.2. The method according to supplement 5, wherein the logical channel configuration is configured by a network device via radio resource control (RRC) signaling.

6. The method according to supplement 1, wherein S3 includes:
   S31: allocating a resource for an MAC SDU of a UE bearer with a maximum number of tokens of UE bearer ($B_k$) in the logical channel j if the number of tokens of logical channel ($B_j$) associated with the logical channel j is greater than 0;
   S32: subtracting the number of tokens of UE bearer ($B_k$) by a size of a served MAC SDU;
   S33: subtracting the number of tokens of logical channel ($B_j$) by the size of the served MAC SDU; and
   S34: cyclically performing the processing in S31-S33, until either data for the logical channel j or uplink grant is exhausted.

7. The method according to supplement 1, wherein before S3, the method further includes:
   increasing the number of tokens of UE bearer ($B_k$) by PBR/K×T, and if a resulted value of the number of tokens of UE bearer ($B_k$) is greater than a size of a UE bearer token bucket, set the value of the number of tokens of UE bearer ($B_k$) to be of the size of the UE bearer token bucket, wherein K is a total number of UE bearers in the logical channel j, and T is an elapsed time since last increasing the number of tokens of UE bearer ($B_k$).

8. The method according to supplement 7, wherein the size of the UE bearer token bucket is: PBR/K×B SD.

9. A resource allocation method, wherein the method includes:
   S1: acquiring UE bearer information;
   S2: dividing MAC SDUs of different UE bearers into different queues in a buffer of an MAC layer according to the UE bearer information; and
   S3: if a logical channel j is selected for performing resource allocation, allocating resources for the MAC SDUs of the UE bearers according to the number of tokens of logical channel ($B_j$) maintained for the logical channel j, wherein the resources are allocated by round robin for the MAC SDUs of the UE bearers in the logical channel j, until either data for the logical channel j or uplink grant is exhausted.

10. The method according to supplement 9, wherein the method is applicable to a first IAB node or second IAB node in the IAB network, the second IAB node being an intermediate IAB node in the IAB network.

11. A resource allocation method, wherein the method includes:
   S1: acquiring the number of UE bearers on each ingress BH RLC channel;
   S2: dividing MAC SDUs from different ingress BH RLC channels into different queues in a buffer of an MAC layer; and
   S3: if a logical channel j is selected for performing resource allocation, allocating resources for the MAC SDUs from the ingress BH RLC channels according to the number of tokens ($B_m$) maintained for queues from ingress BH RLC channel m in the logical channel j, the number of tokens ($B_m$) being related to the number of UE bearers on each ingress BH RLC channel, and the MAC SDUs from each ingress BH RLC channel referring to MAC SDUs of all UE bearers on the ingress BH RLC channel.

12. The method according to supplement 11, wherein the method is applicable to a second IAB node in the IAB network, the second IAB node being an intermediate IAB node of the IAB network.

13. The method according to supplement 11, MAC SDUs of the logical channel j from different ingress BH RLC channels share the same logical channel configuration.

13.1. The method according to supplement 13, wherein the logical channel configuration includes at least one of the following:
   a logical channel priority;
   a prioritized bit rate (PBR); or a bucket size duration (BSD).

13.2. The method according to supplement 13, wherein the logical channel configuration is configured by a network device via radio resource control (RRC) signaling.

14. The method according to supplement 11, wherein S3 includes:
  S31: allocating a resource for an MAC SDU from the ingress BH RLC channel m having a maximum number of tokens ($B_m$) in the logical channel j if the number of tokens of logical channel ($B_j$) associated with the logical channel j is greater than 0;
  S32: subtracting the number of tokens ($B_m$) by a size of a served MAC SDU;
  S33: subtracting the number of tokens of logical channel ($B_j$) by the size of the served MAC SDU; and
  S34: cyclically performing the processing in S31-S33, until either data for the logical channel j or uplink grant is exhausted.

15. The method according to supplement 11, wherein before S3, the method further includes:
  increasing the number of tokens ($B_m$) by PBR×$k_m$/K×T, and if a resulted value of the number of tokens ($B_m$) is greater than a size of a token bucket, set the value of the number of tokens ($B_m$) to be of the size of the token bucket, wherein $k_m$ is the number of UE bearers on each ingress BH RLC channel m, K is a total number of UE bearers in the logical channel j, and T is an elapsed time since last increasing the number of tokens ($B_m$).

16. The method according to supplement 15, wherein the size of the token bucket is PBR×$k_m$/K×B SD.

17. The method according to supplement 11, wherein S1 includes: receiving configuration information used for indicating the number of UE bearers on a BH RLC channel from an IAB donor.

17.1. The method according to supplement 17, wherein the configuration information is provided by the IAB-donor via an F1AP.

17.2. The method according to supplement 17, wherein the configuration information is provided by the IAB-donor via RRC signaling.

18. An IAB node, including a memory and a processor, the memory storing a computer program, wherein the processor is configured to execute the computer program to implement the method described in any one of supplements 1-17.

19. A communication system, including a first IAB node and a second IAB node, wherein the first IAB node is configured to execute the method described in any one of supplements 1-10, and the second IAB node is configured to execute the method described in any one of supplements 1-17.

What is claimed is:

1. A resource allocation apparatus, comprising:
  acquiring processor circuitry configured to acquire UE bearer information;
  allocating processor circuitry configured to allocate a resource for an MAC SDU of a UE bearer k in a logical channel j, allocation of the resource being related to the number of tokens of UE bearer in the logical channel j; and
  second processor circuitry configured to increase the number of tokens of UE bearer ($B_k$) by PBR/K×T, and if a resulted value of the number of tokens of UE bearer ($B_k$) is greater than a size of a UE bearer token bucket, set the value of the number of tokens of UE bearer ($B_k$) to be of the size of the UE bearer token bucket, wherein K is a total number of UE bearers in the logical channel j, and T is an elapsed time since last increasing the number of tokens of UE bearer ($B_k$).

2. The resource allocation apparatus according to claim 1, wherein the resource allocation apparatus is applicable to a first IAB node in an IAB network, the first IAB node being a first IAB node in an upstream path of the IAB network, the UE bearer information being added into a BAP (Backhaul Adaptation Protocol) header of a BAP layer of the first IAB node, and being transferred from the BAP layer to an MAC layer of the first IAB node.

3. The resource allocation apparatus according to claim 1, wherein the resource allocation apparatus is applicable to a second IAB node in an IAB network, the second IAB node being an intermediate IAB node in the IAB network, the UE bearer information being acquired by the second IAB node from a first IAB node, and the first IAB node being a first IAB node in an upstream path of the IAB network.

4. The resource allocation apparatus according to claim 1, wherein the UE bearer information is at least one of the following:
  a UE ID;
  a UE bearer ID; or
  a TEID.

5. The resource allocation apparatus according to claim 1, wherein the allocating processor circuitry cyclically performs the following processing, until either data for the logical channel j or uplink grant is exhausted:
  allocating a resource for an MAC SDU of a UE bearer with a maximum number of tokens of UE bearer ($B_k$) in the logical channel j if the number of tokens of logical channel ($B_j$) associated with the logical channel j is greater than 0;
  subtracting the number of tokens of UE bearer ($B_k$) by a size of a served MAC SDU; and
  subtracting the number of tokens of logical channel (Bi) by the size of the served MAC SDU.

6. The resource allocation apparatus according to claim 1, wherein the size of the UE bearer token bucket is PBR/K×BSD.

7. A resource allocation apparatus, comprising:
  acquiring processor circuitry configured to acquire UE bearer information;
  allocating processor circuitry configured to allocate resources for MAC SDUs of UE bearers according to the number of tokens of logical channel ($B_j$) maintained for a logical channel j, wherein the resources are allocated by round robin for the MAC SDUs of the UE bearers in the logical channel j, until either data for the logical channel j or uplink grant is exhausted; and
  second processor circuitry configured to increase the number of tokens of UE bearer ($B_k$) by PBR/K×T, and if a resulted value of the number of tokens of UE bearer ($B_k$) is greater than a size of a UE bearer token bucket, set the value of the number of tokens of UE bearer ($B_k$) to be of the size of the UE bearer token bucket, wherein K is a total number of UE bearers in the logical channel j, and T is an elapsed time since last increasing the number of tokens of UE bearer ($B_k$).

8. The resource allocation apparatus according to claim 7, wherein the resource allocation apparatus is applicable to a first IAB node or a second IAB node in an IAB network, the second IAB node being an intermediate IAB node in the IAB network.

9. A resource allocation apparatus, comprising:
  acquiring processor circuitry configured to acquire the number of UE bearers on an ingress BH RLC (Backhaul Radio Link Control) channel;

allocating processor circuitry configured to allocate a resource for an MAC SDU from an ingress BH RLC channel m in a logical channel j according to a first number of tokens ($B_m$), the first number of tokens ($B_m$) being related to the number of UE bearers on each ingress BH RLC channel in the logical channel j; and second processor circuitry configured to increase the first number of tokens ($B_m$) by PBR×$k_m$/K×T, and if a resulted value of the first number of tokens ($B_m$) is greater than a size of a token bucket, set the value of the first number of tokens ($B_m$) to be of the size of the token bucket; wherein $k_m$ is the number of UE bearers on the ingress BH RLC channel m, K is a total number of UE bearers in the logical channel i, and T is an elapsed time since last increasing the first number of tokens ($B_m$).

10. The resource allocation apparatus according to claim 9, wherein the resource allocation apparatus is applicable to a second IAB node in an IAB network, the second IAB node being an intermediate IAB node in the IAB network.

11. The resource allocation apparatus according to claim 9, wherein logical channel configuration of data from a first BH RLC channel is identical to logical channel configuration of data from a second BH RLC channel in the logical channel j, the identical logical channel configuration is logical channel configuration of the logical channel j.

12. The resource allocation apparatus according to claim 9, wherein the allocating processor circuitry cyclically performs the following processing, until either data for the logical channel j or uplink grant is exhausted:
    allocating a resource for an MAC SDU from the ingress BH RLC channel m with a maximum first number of tokens ($B_m$) in the logical channel j if the number of tokens of logical channel ($B_j$) associated with the logical channel j is greater than 0;
    subtracting the first number of tokens ($B_m$) by a size of a served MAC SDU; and
    subtracting the number of tokens of logical channel ($B_j$) by the size of the served MAC SDU.

13. The resource allocation apparatus according to claim 9, wherein the size of the token bucket is PBR×$k_m$/K×BSD.

14. The resource allocation apparatus according to claim 9, wherein the acquiring processor circuitry receives configuration information used for indicating the number of UE bearers on a BH RLC channel from an IAB donor.

15. The resource allocation apparatus according to claim 14, wherein the configuration information is provided by the IAB donor via an F1AP.

16. The resource allocation apparatus according to claim 14, wherein the configuration information is provided by the IAB donor via RRC signaling.

* * * * *